(12) United States Patent
Smith

(10) Patent No.: US 6,260,864 B1
(45) Date of Patent: Jul. 17, 2001

(54) GAME TRANSPORTING SYSTEM

(76) Inventor: Philip D. Smith, 950 Clearwater Rd., North Augusta, SC (US) 29841

( * ) Notice: Subject to any disclaimer, the term of this patent is extended or adjusted under 35 U.S.C. 154(b) by 0 days.

(21) Appl. No.: 09/387,676

(22) Filed: Aug. 31, 1999

Related U.S. Application Data

(63) Continuation-in-part of application No. 08/812,050, filed on Mar. 8, 1997, now abandoned.

(51) Int. Cl.[7] ..................................................... B62B 1/02
(52) U.S. Cl. .......................................... 280/47.26; 280/63
(58) Field of Search ............................... 280/1.5, 47.131, 280/47.17, 47.18, 47.24, 47.26, 47.331, 204, 63, 79.3

(56) References Cited

U.S. PATENT DOCUMENTS

| | | | | |
|---|---|---|---|---|
| 2,462,964 | * | 3/1949 | Heggen | 280/63 |
| 3,406,985 | * | 10/1968 | Ballenger et al. | 280/47.331 |
| 4,052,080 | * | 10/1977 | Hedderich et al. | 280/47.26 |
| 4,214,774 | * | 7/1980 | Kluge | 280/47.331 |
| 4,252,334 | * | 2/1981 | Filkins | 280/47.26 |
| 4,286,800 | * | 9/1981 | Lomas | 280/47.24 |
| 4,465,291 | * | 8/1984 | Wylie et al. | 280/47.24 |
| 5,072,959 | * | 12/1991 | Marullo | 280/47.331 |
| 5,454,577 | * | 10/1995 | Bell | 280/204 |
| 5,586,778 | * | 12/1996 | Lindh et al. | 280/47.24 |
| 5,645,292 | * | 7/1997 | McWilliams et al. | 280/47.26 |
| 5,806,868 | * | 9/1998 | Collins | 280/47.19 |
| 6,050,577 | * | 4/2000 | Smith | 280/47.24 |

FOREIGN PATENT DOCUMENTS

| | | | | |
|---|---|---|---|---|
| 72685 | * | 4/1970 | (DE) | 280/47.18 |
| 2136363 | * | 9/1984 | (GB) | 280/47.24 |

* cited by examiner

*Primary Examiner*—Frank Vanaman

(57) ABSTRACT

A game transporting system for providing a stable transporting structure for easily hauling game, stands, equipment, firewood and other objects. The inventive device includes a V-shaped frame structure, an axle with a pair of wheels rotatably attached thereto wherein the wheels converge inwardly and upwardly wherein the upper portion of the wheels are disposed in closer relation that the lower portions of the wheels, a handle removably attached to the V-shaped frame structure, a pair of angled members attached to the frame in front of the wheels for deflecting grass, trees and bushes, and a pair of support members attached to the upper portion of the handle for receiving the head and neck of a game animal such as a deer. The converging wheels provide increased stability while transporting heavy game animals upon uneven terrain. An optional boat support members each having a side rod and a plurality of connectors for attaching to the V-shaped frame structure.

11 Claims, 5 Drawing Sheets

GAME TRANSPORTING SYSTEM

CROSS-REFERENCE TO RELATED APPLICATION

This application is a continuation-in-part from U.S. patent application Ser. No. 08/812,050 filed on Mar. 8, 1997 entitled Deer Cart. The 08/812,050 application is abandoned.

BACKGROUND OF THE INVENTION

1. Field of the Invention

The present invention relates generally to cart devices and more specifically it relates to a game transporting system for providing a stable transporting structure for easily hauling game, stands, equipment, firewood and other objects.

Individuals, such as hunters, often times must transport heavy and awkward objects through uneven terrain. Many individuals are forced to drag the object upon the ground surface which can be very tiring over a period of time. Other individuals utilize all-terrain vehicles (ATV) for hauling the objects, however ATVs are expensive and are relatively noisy which is undesirable when hunting wild game. Hence, there is a need for a game transporting system that can be easily utilized by a hunter.

2. Description of the Prior Art

Cart devices have been in use for years. Typically, a cart includes a pair of wheels rotatably attached to a frame structure having a plurality of side walls along with a handle for pulling the conventional cart.

Unfortunately, conventional carts are not designed for utilization within uneven terrain such as in a field where hunters require the use of the conventional cart to transport game. Conventional carts are prone to tipping over because of the lack of stability within the carts.

In addition, conventional carts are difficult to load with the game because the individual has to manually elevate the game a distance above the upper rim of the conventional cart which can be three feet high. When attempting to lift a large game animal such as a deer, antelope, elk or moose, a conventional cart is almost impossible to utilize.

Another disadvantage of conventional carts for use with game is that when a game animal is that the wheels of the conventional cart are typically centered thereby requiring the weight of the game to be evenly distributed upon the cart. Unfortunately, game animals such as deer, antelope, elk, bear or moose have a majority of their weight toward the rear portion thereby making it difficult to evenly position the game upon a conventional cart.

Examples of attempted cart devices include U.S. Pat. No. 4,252,334 to Filkins; U.S. Pat. No. 4,286,800 to Lomas; U.S. Pat. No. 5,645,292 to McWilliams et al; U.S. Pat. No. 5,328,192 to Thompson; U.S. Pat. No. 4,215,877 to Pritchett; U.S. Pat. No. 3,907,323 to Knapp; U.S. Pat. No. 3,222,100 to Lindzy; U.S. Pat. No. 2,183,066 to Fields which are all illustrative of such prior art.

Filkins (U.S. Pat. No. 4,252,334) discloses a balanced wheelbarrow. Filkins teaches a load carrying portion supported by a frame having handles at one end thereof and a pair of wheels jounalled at the opposite end thereof. Filkins teaches the pair of wheels diverging inwardly ad upwardly for providing stability and facilitating the turning ability of the wheelbarrow.

Lomas (U.S. Pat. No. 4,286,800) discloses a trailer. Lomas teaches a wheeled chassis which is connected to a load support frame by an articulated linkage whereby the frame can be moved vertically in relation to the chassis.

McWilliams et al (U.S. Pat. No. 5,645,292) discloses an ATV trailer for transporting game. McWilliams et al teaches an upwardly opening body having a V-shaped cross section having a towing tongue for connecting to an ATV.

While these devices may be suitable for the particular purpose to which they address, they are not as suitable for providing a stable transporting structure for easily hauling game, stands, equipment, firewood and other objects. Conventional cart devices do not provide a stable structure for transporting awkward objects upon even terrain.

In these respects, the game transporting system according to the present invention substantially departs from the conventional concepts and designs of the prior art, and in so doing provides an apparatus primarily developed for the purpose of providing a stable transporting structure for easily hauling game, stands, equipment, firewood and other objects.

SUMMARY OF THE INVENTION

In view of the foregoing disadvantages inherent in the known types of cart devices now present in the prior art, the present invention provides a new game transporting system construction wherein the same can be utilized for providing a stable transporting structure for easily hauling game, stands, equipment, firewood and other objects.

The general purpose of the present invention, which will be described subsequently in greater detail, is to provide a new game transporting system that has many of the advantages of the cart devices mentioned heretofore and many novel features that result in a new game transporting system which is not anticipated, rendered obvious, suggested, or even implied by any of the prior art cart devices, either alone or in any combination thereof.

To attain this, the present invention generally comprises a V-shaped frame structure, an axle with a pair of wheels rotatably attached thereto wherein the wheels converge inwardly and upwardly wherein the upper portion of the wheels are disposed in closer relation that the lower portions of the wheels, a handle removably attached or hinged to the V-shaped frame structure, a pair of angled members attached to the frame in front of the wheels for deflecting grass, trees and bushes, and a pair of support members attached to the upper portion of the handle for receiving the head and neck of a game animal such as a deer. The diverging wheels provide increased stability while transporting heavy game animals upon uneven terrain. An optional boat support members each having a side rod and a plurality of connectors for attaching to the Vshaped frame structure.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a game transporting system that will overcome the shortcomings of the prior art devices.

Another object is to provide a game transporting system that provides a stable structure for transporting awkward game such as deer, antelope, elk, bear, moose and other game.

An additional object is to provide a game transporting system that allows the game to be easily positioned upon the cart.

A further object is to provide a game transporting system that can be utilized upon uneven terrain.

Another object is to provide a game transporting system that can be manually manipulated or attached to an ATV.

An additional object is to provide a game transporting system that snugly receives a game animal without movement during travel.

A further object is to provide a game transporting system that adequately supports the head and neck of the game during travel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
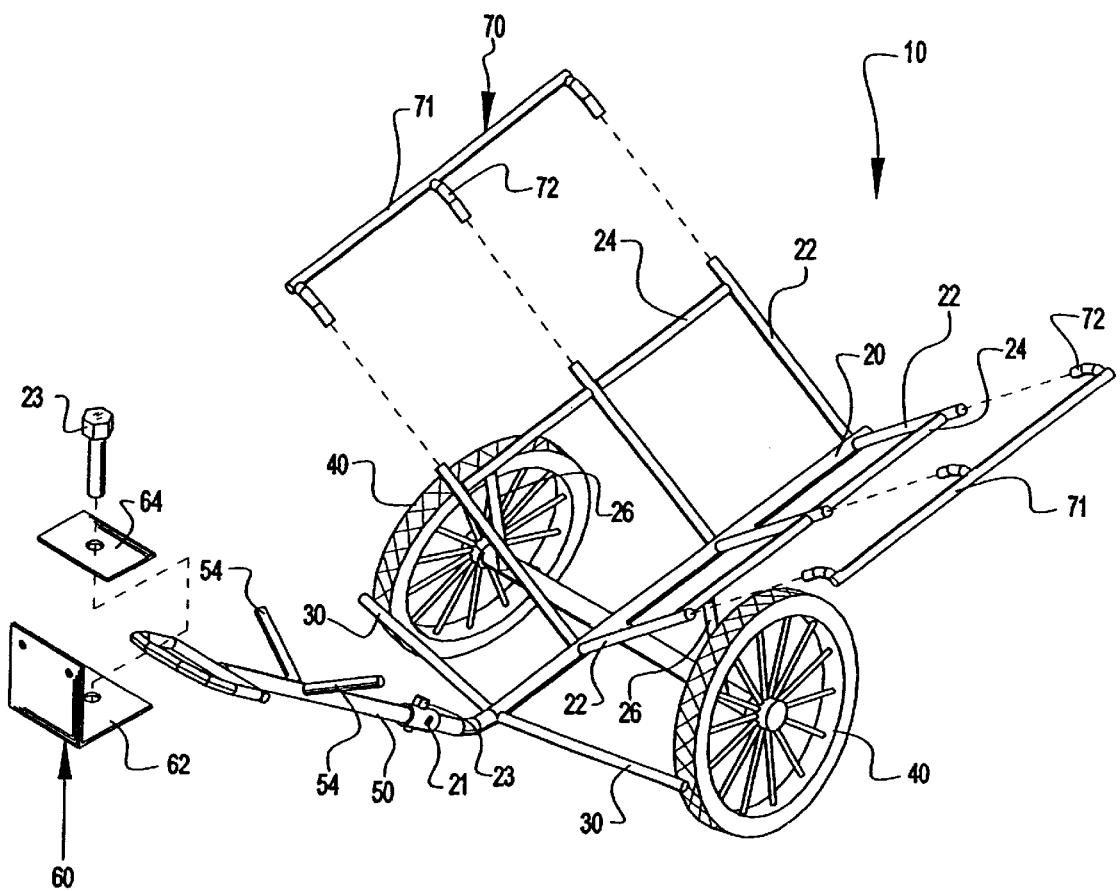
FIG. 1 is an upper perspective view of the present invention.

Turning now descriptively to the drawings, in which similar reference characters denote similar elements throughout the several view, FIGS. 1 through 5 illustrate a game transporting system 10, which comprises a V-shaped frame structure, an axle 28 with a pair of wheels 40 rotatably attached thereto wherein the wheels 40 converge inwardly and upwardly wherein the upper portion of the wheels 40 are disposed in closer relation that the lower portions of the wheels 40, a handle 50 removably attached or hinged to the V-shaped frame structure, a pair of angled members 30 attached to the frame in front of the wheels 40 for deflecting grass, trees and bushes, and a pair of support members 54 attached to the upper portion of the handle 50 for receiving the head and neck of a game animal such as a deer 12. The diverging wheels 40 provide increased stability while transporting heavy game animals upon uneven terrain. An optional boat support members 70 each having a side rod 72 and a plurality of connectors 74 for attaching to the V-shaped frame structure.

Figure 2:
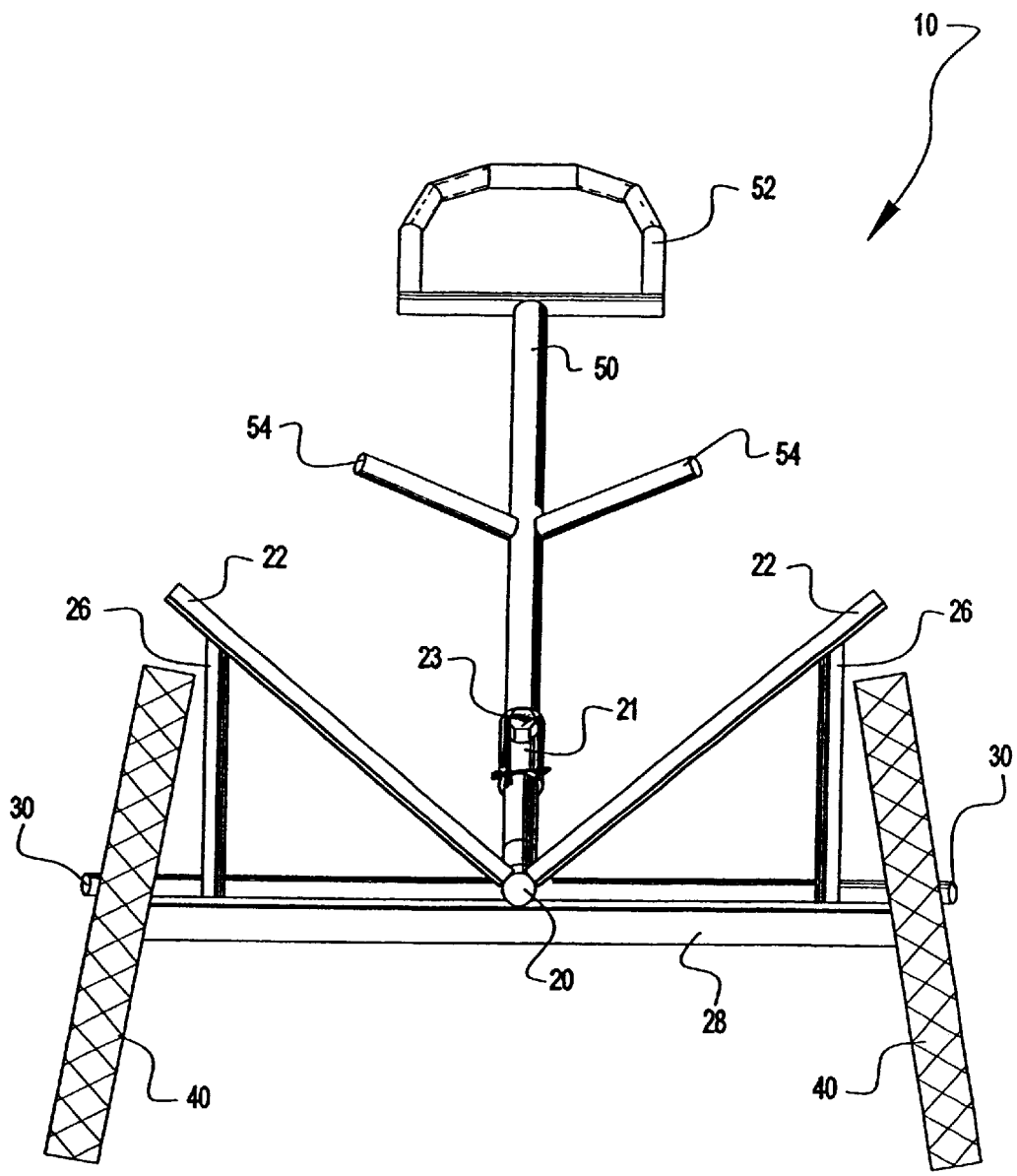
FIG. 2 is a rear end view of the present invention.
Figure 3:
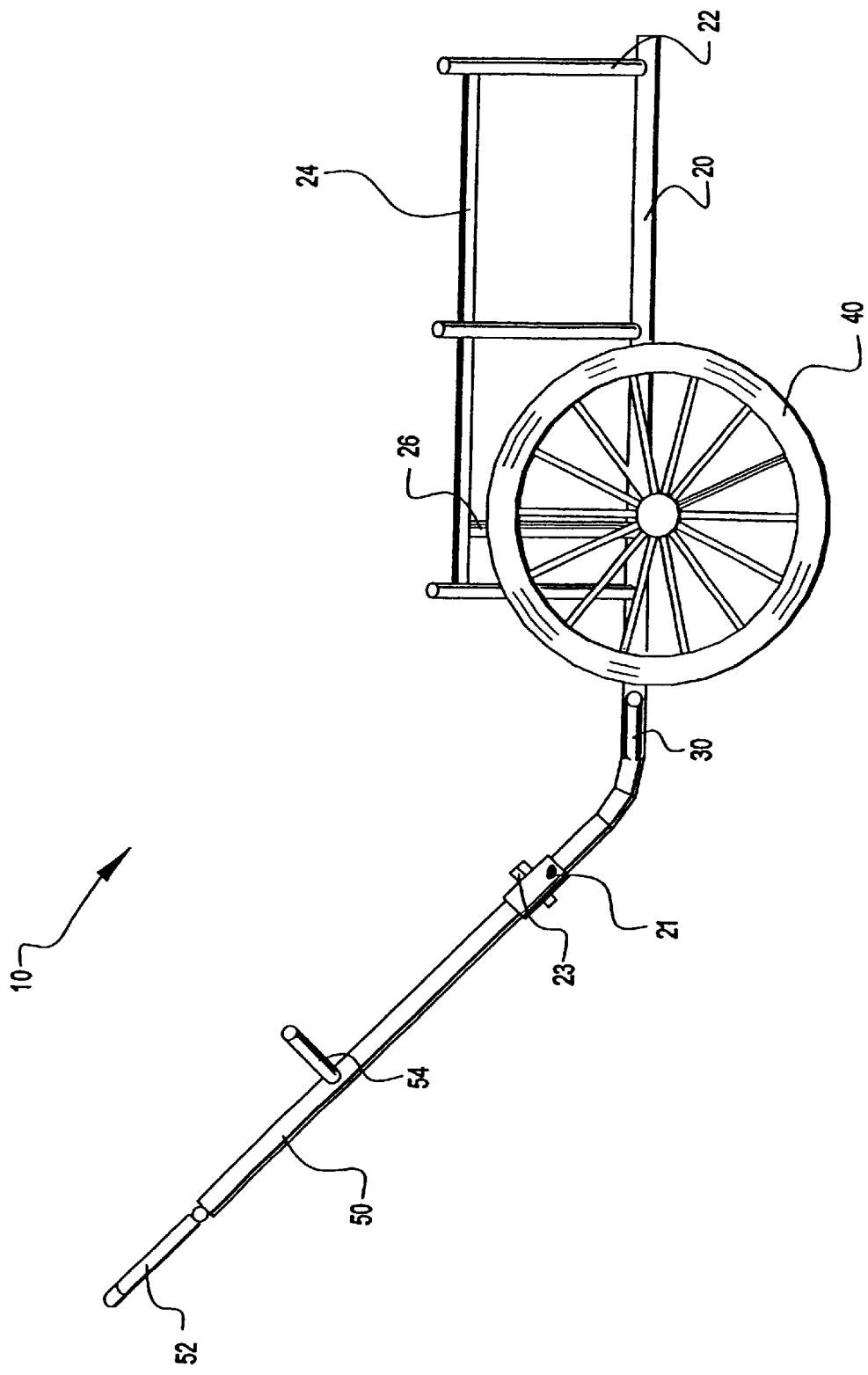
FIG. 3 is a side view of the present invention.
Figure 4:
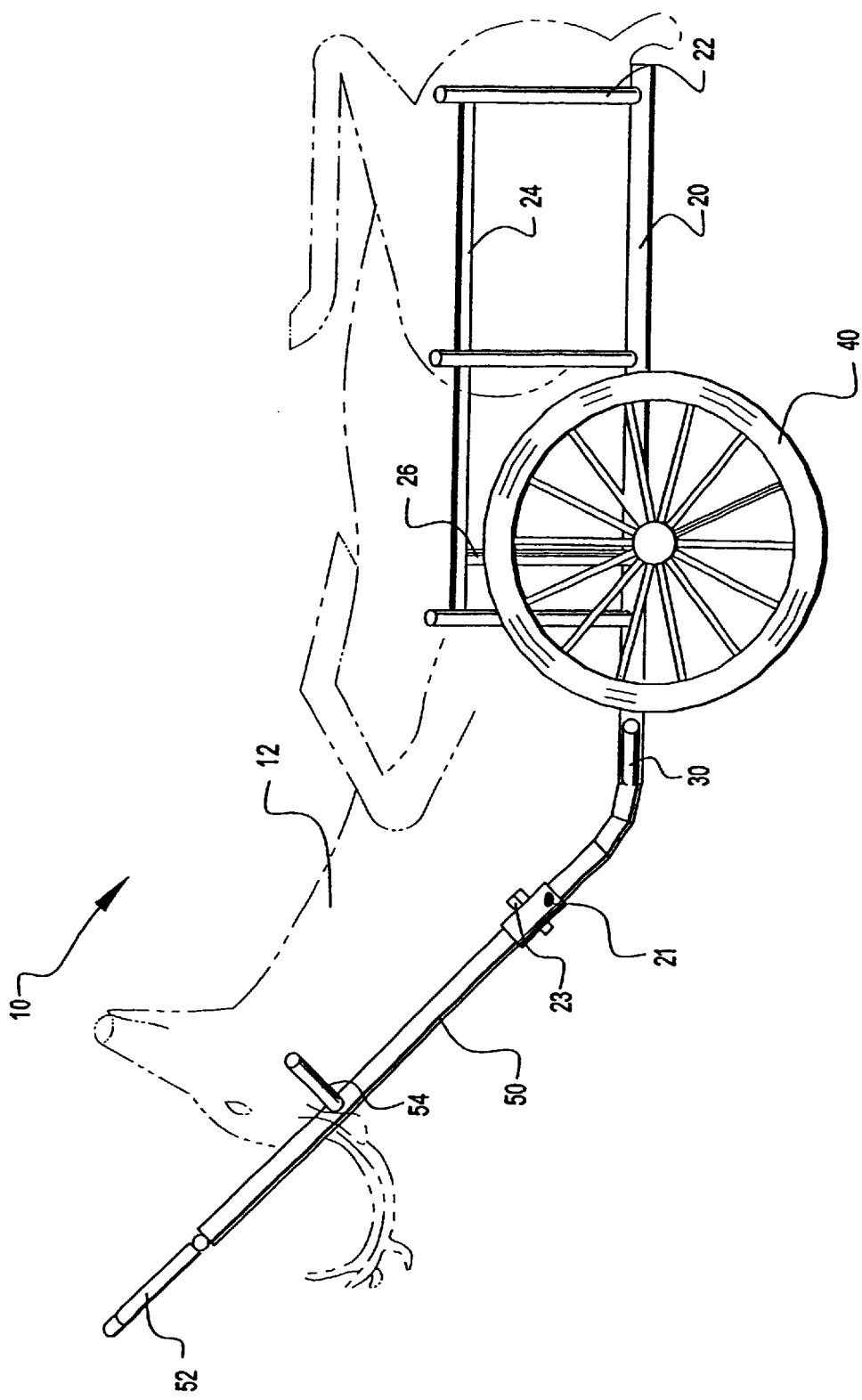
FIG. 4 is a side view of the present invention with a game animal positioned within.
Figure 5:
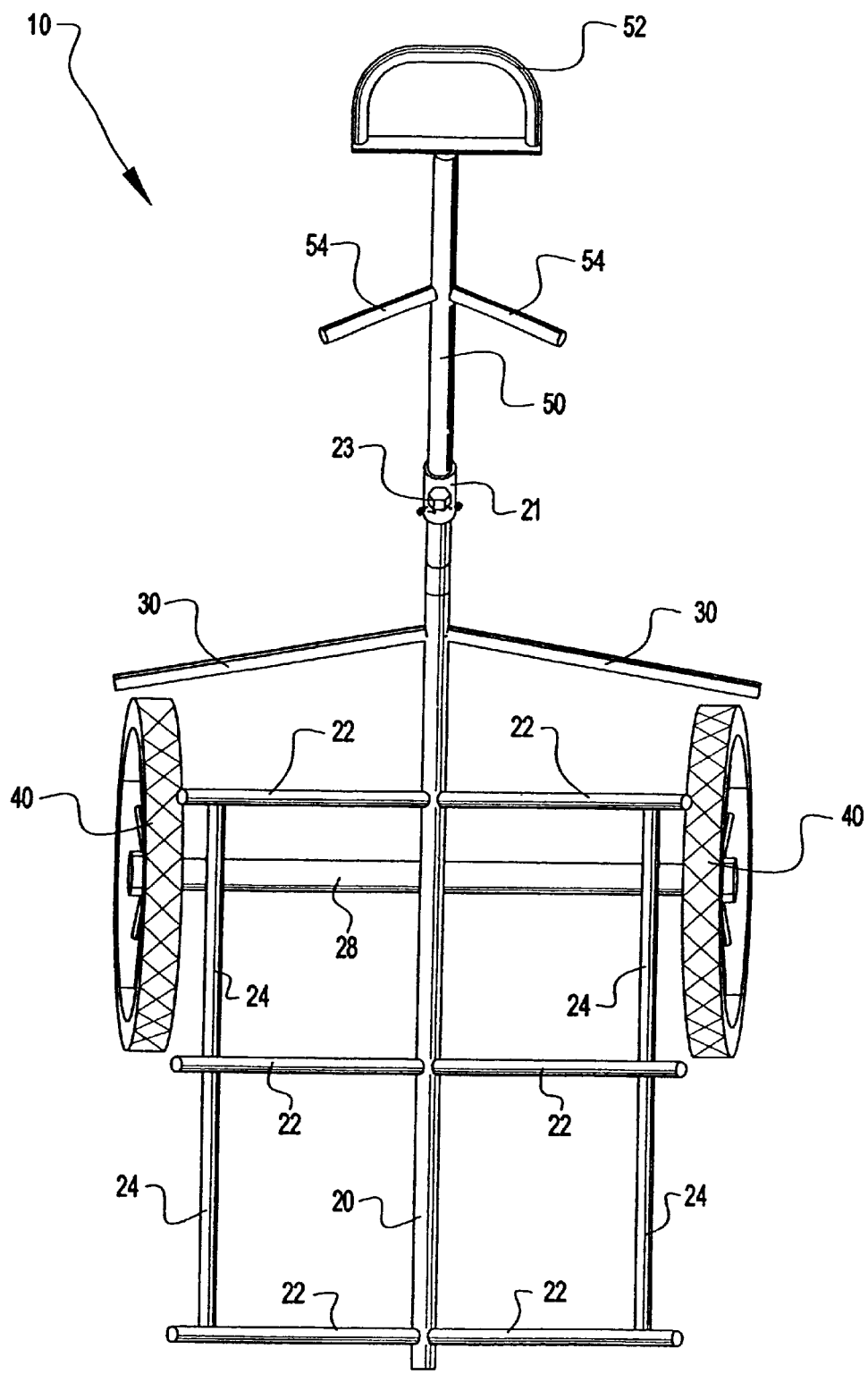
FIG. 5 is a top view of the present invention.

As best shown in FIGS. 1 and 5 of the drawings, the V-shaped frame structure includes a center member 20 extending longitudinally through the present invention. A plurality of rib members 22 extend orthogonally from the center member 20 as best shown in FIG. 2 of the drawings. The rib members 22 converge outwardly and upwardly from the center member 20 so that the upper distal ends are farther away than the lower ends of the rib members 22.

A plurality of side members 24 are attached between upper portions of the rib members 22 for providing support to the rib members 22 while transporting a game animal such as a deer 12. A portion of the rib members 22 extend past the side members 24 as shown in FIGS. 1 through 5 for receiving the optional boat support members 70. A pair of vertical members 26 extend from the axle 28 upwardly to a corresponding pair of side members 24 for providing increased support to the invention while loaded.

As shown in FIGS. 1, 2 and 5 of the drawings, the axle 28 is attached to the center member 20 and the pair of vertical members 26. The wheels 40 are journaled to opposing ends of the axle 28 for providing maximum stability for the invention while transporting a heavy and awkward object over uneven terrain. As best shown in FIG. 2 of the drawings, the wheels 40 converge inwardly and upwardly for providing a wider wheel base thereby increasing the stability of the invention while transporting a game animal over uneven terrain. The lower portions of the wheels 40 are farther apart than the upper portions of the wheels 40 as best shown in FIG. 2 of the drawings. When the invention is tilted to one side, the angled wheels 40 provide increased gripping and support on the side supporting a majority of the weight.

As best shown in FIGS. 1, 3, 4 and 5 of the drawings, the center member 20 extends forwardly from the rib members 22 and is angled upwardly with a coupler 21 attached to the distal end thereof. As best shown in FIG. 5 of the drawings, a pair of angled members 30 extend from the center member 20 for pushing grass, brush and bushes away from the tires and the game animal during transporting of the game animal such as a deer 12.

As shown in FIGS. 1, 2, 3, 4 and 5 of the drawings, an elongate handle 50 is insertable into the coupler or hinge 21 and secured within the coupler or hinge 21 by a fastener 23 or other conventional securing means. The handle 50 includes a grip member 52 for manually grasping by the user. A pair of support members 54 are attached to the handle 50 in a V-shape for receiving and capturing a neck and head of the game animal. An addition strap or other structure may be utilized between the distal ends of the support members 54 for ensuring that the head and neck do not become accidentally removed during transportation.

As shown in FIG. 1 of the drawings, an optional ATV attachment 60 is provided having a lower member 62 and an upper member 64 with corresponding apertures within both. A conventional fastener 23 is insertable through the apertures for securing the upper member 64 and the lower member 62 about the grip member 52 of the elongate handle 50.

As further shown in FIG. 1 of the drawings, a pair of boat support members 70 are attachable to the distal ends of the rib members 22 for supporting a boat thereby allowing a user to easily transport the boat within an enclosed area. Each of the boat support members 70 is comprised of a side rod 72 with a plurality of connectors 74 extending there from for slidably engaging the distal ends of the rib members 22. The boat is positioned upon the boat support members 70 and transported to the desired location.

In use, the user positions the invention in the desired location of a field next to where they are hunting while transporting their hunting gear including deer 12 stand. After the user shoots the game animal, such as a deer 12, he or she positions the invention with the rear portion facing the head portion of the deer 12. The user then tilts the invention rearwardly so that the rear portion of the invention is adjacent to the ground surface. The user then engages and pulls the deer 12 upon the invention. After the deer 12 is properly positioned upon the invention, the neck and head of the deer 12 is positioned within the support members 54 for supporting the neck and head of the deer 12 during transportation. The user then grasps the grip member 52 of the elongate handle 50 and transports the deer 12 back to their vehicle. While traveling over uneven terrain, the angled wheels 40 provide a stable base preventing the invention from tipping completely over to one side or the other. The angled members 30 extending in front of the wheels 40 and the deer 12 push long grass, bushes and brush downwardly thereby allowing the deer 12 and the wheels 40 to be free of such debris. Upon reaching the desired location, the user simply removes the head of the deer 12 from the support members 54 and tilts the invention rearwardly and pulling the deer 12 from the invention. The fastener 23 within the coupler or hinge 21 is then loosened allowing the handle 50 to be removed from the coupler or hinged back into the carriage 21 and the invention is then positioned in a compact storage position within the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A game transporting system for transporting a game animal from a remote location, comprising:
    a frame structure opening upwardly and having an open rear portion for receiving said game animal;
    a pair of wheels journaled to said frame structure, wherein said pair of wheels converge inwardly and upwardly; and
    a handle secured to a front portion of said frame structure extending opposite of said open rear portion;
    wherein said pair of wheels are positioned between a center point of said frame and said handle;
    wherein said frame structure comprises:
        an axle member rotatably supporting said pair of wheels;
        a center member secured to said axle member; and
        a plurality of rib members extending from said center member;
    wherein said frame structure further includes a pair of angled members extending horizontally from said center member in front of said frame for diverting tall debris from said game animal and said wheels.

2. The game transporting system of claim 1, wherein said frame structure includes a pair of vertical members extending from said rib members.

3. The game transporting system of claim 2, wherein said frame structure further includes a plurality of side members extending between upper portions of said rib members.

4. The game transporting system of claim 1, wherein said handle includes a grip member for engagement by a user.

5. The game transporting system of claim 1, including an ATV attachment secured to a distal end of said handle for securing to a grip member and to an ATV.

6. A combination boat and game transporting system for transporting a game animal from a remote location, comprising:
    a frame structure opening upwardly and having an open rear portion for receiving said game animal;
    a pair of wheels journaled to said frame structure, wherein said pair of wheels converge inwardly and upwardly; and
    a handle secured to a front portion of said frame structure extending opposite of said open rear portion;
    wherein said pair of wheels are positioned between a center point of said frame and said handle;
    wherein said frame structure comprises:
        an axle member rotatably supporting said pair of wheels;
        a center member secured to said axle member;
        a plurality of rib members extending from said center member; and
        a pair of boat support members for removably attaching to distal ends of said plurality of rib members;
    wherein said frame structure further includes a pair of angled members extending horizontally from said center member in front of said frame for diverting tall debris from said game animal and said wheels.

7. The combination boat and game transporting system of claim 6, wherein said rib members form a V-shaped channel for receiving said game animal.

8. The combination boat and game transporting system of claim 6, wherein said handle includes a pair of support members for supporting a head of said game animal.

9. The combination boat and game transporting system of claim 8, wherein said pair of support members form a V-shape.

10. The combination boat and game transporting system of claim 6, wherein said center member includes a coupler member secured to a front distal end for removably receiving said handle.

11. The combination boat and game transporting system of claim 6, wherein said frame structure includes a pair of vertical members extending from said rib members.

* * * * *